March 10, 1942. J. H. LEONARD 2,275,591
MOLDING METHOD AND INSERT FOR MOLDED ARTICLES
Filed April 12, 1939
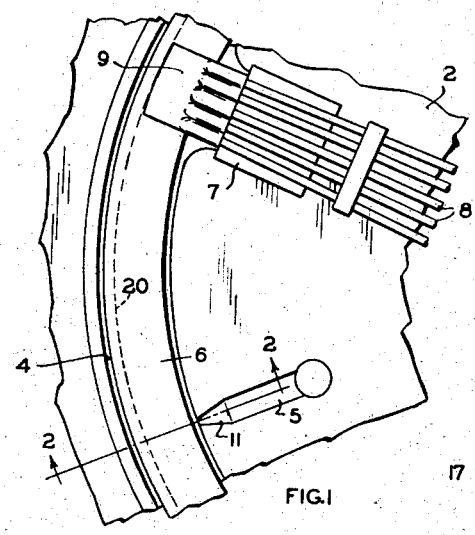
FIG.1
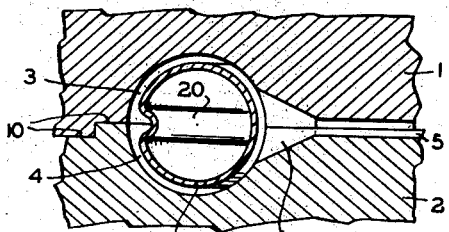
FIG.2
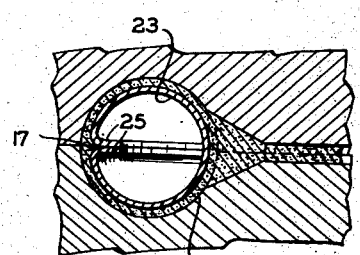
FIG.4
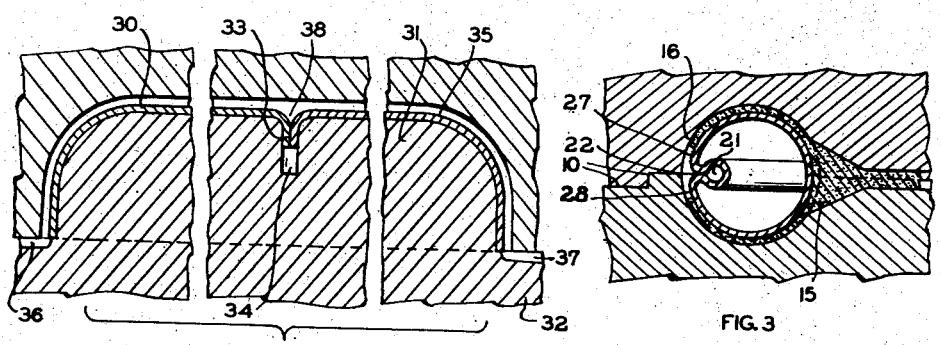
FIG.5
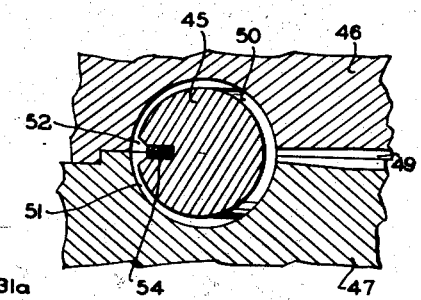
FIG.3
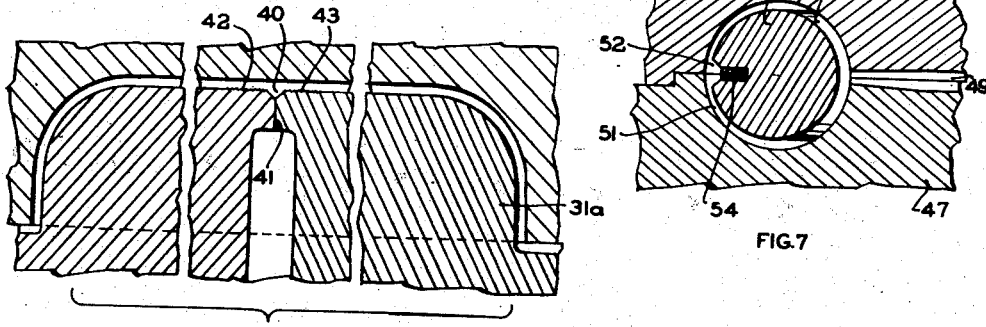
FIG.6 · FIG.7
INVENTOR.
John H. Leonard Patented Mar. 10, 1942

2,275,591

UNITED STATES PATENT OFFICE 2,275,591

MOLDING METHOD AND INSERT FOR MOLDED ARTICLES

John H. Leonard, Avon Lake, Ohio, assignor, by mesne assignments, to The Standard Products Company, Port Clinton, Ohio, a corporation of Ohio Application April 12, 1939, Serial No. 267,464

12 Claims. (Cl. 18—59)

This invention relates to the forming of thermally moldable plastic materials such, for example, as cellulose organic acid esters, around insert or core members, either wholly or partially to envelop such inserts or cores with the plastic material. Inserts are highly desirable in reducing the percentage of plastic material in the molded articles, thereby to reduce expense. Inserts are also used to some extent as reinforcing members.

An object is to provide a method and means for securing better welding together of confluent streams of plastic material in a mold cavity about a core or an insert supported in the mold cavity.

A more specific object is to provide greater strength of the molded plastic envelope in the region of welding of confluent streams of the plastic material during the molding process.

Another object is to provide an improvement in the controlling of flow of plastic material in a mold cavity.

Other objects and features of the invention will become apparent from the following description relating to the accompanying drawing illustrating the manner of carrying out the invention as a method, and illustrating exemplary modifications in core and mold members incident thereto.

In the molding of thermoplastic material such as cellulose acetate about or in covering relation to metal inserts, it is posisble to make practically the entire article from metal or other suitable insert material. For instance, in the making of steering wheels for vehicles, the thickness of the plastic material need only be about $\frac{1}{32}$ of an inch. A process of making such type of composite article is shown, described and claimed in the prior patent to Harry A. Husted, 2,043,584, issued June 9, 1936, and owned by the assignee hereof. In making such moldings, the plastic material is injected into the mold under several tons pressure and is caused to flow about the metal insert, and various methods may be used to control or predetermine the location of the weld line of confluent streams of the plastic. For instance, in the prior application of Harry R. Husted, Serial No. 127,970, filed February 26, 1937 and the application of Dwight M. Anderson, Serial No. 132,849, filed March 24, 1937, offsetting of the insert with reference to the main cavity between the separable mold members and/or the application of regional heat at certain portions of the mold members are utilized to control the location of the weld line between different stream portions of the plastic material supplied to the cavity. Another manner of controlling the weld line location is illustrated in the application of James S. Reid, Serial No. 119,496, filed January 7, 1937, which consists essentially in the provision of special gating for the main cavity with respect to the insert and to the parting line of the mold sections. All the above identified prior applications are owned by the assignee of the present application.

In a practical application of the principles taught by said applications, it is necessary to provide for the exfiltration of gas and air from the mold cavity in the zone of confluence of the streams of plastic material in the mold, for otherwise the gases are entrapped and, under the tremendous pressures employed in injection molding, sometimes explode, burning the finished article. In any event, entrapped air or gas is apt to cause pits in the exposed surface of the article, and/or to cause cells at the joint formed where the welding occurs, thus weakening the joint. Sufficient exfiltration of air and gas usually occurs if the welding takes place at the parting line of the mold members, because it is impossible in practice to seal the cavity against exudation of air and gas at the parting line.

The present invention as distinguished from the inventions above discussed, and the prior art generally, comprises special treatment of the insert or core so that it is unnecessary to make any other provision for the escape of gases from the mold members. The treatment may comprise, for example, indenting certain surface portions of the insert with respect to others so as to provide greater thickness of the plastic in the expected or predetermined region of the weld line of confluent streams of plastic, thus allowing greater freedom of movement of the approaching ends of the streams at the welding point and a thickening of the molded envelope at the welded region. The thicker layer of plastic which occurs at the weld line necessarily provides greater strength than a thin layer. One advantage of this treatment is that uniform, smooth-surfaced moldings can be made whether or not the welding occurs in the region of the parting line of the separable mold sections. It also enables the elimination of fins, parting line markings, etc., on the surfaces of moldings which are to be exposed in use and in instances where it is necessary that the welding shall take place at such exposed surface portions of the molding.

The invention further contemplates treatment of the insert so as to include means permitting exfiltration of air or gas into a relatively large hollow space within the insert. The insert may be of composite form, and include material specially adapted to absorb gas but prevent flow of plastic material thereinto, as will later be explained.

In the drawing, Fig. 1 is a fragmentary plan view of a portion of one mold section and a portion of an insert supported in the mold cavity of such section;

Fig. 2 is a fragmentary transverse sectional view through the cavity and insert held therein, the view being taken substantially along the line 2—2 on Fig. 1;

Figs. 3 and 4 are sectional views similar to Fig. 2, showing modifications of the insert;

Fig. 5 is a sectional view through coacting mold members and an insert supported therein in spaced relation to but one of the mold sections and forming, in effect, one side of the mold cavity;

Fig. 6 is a sectional view similar to Fig. 5, but showing some of the principles hereof practiced without using any insert, and Fig. 7 is a sectional view through coacting mold members and an insert, showing a further modification of insert.

In Figs. 1 and 2 the mold sections are indicated at 1 and 2. The mold sections are provided with coacting cavity surfaces 3 and 4 and communicating therewith a gate 5, which may be formed partly in each of the sections. The core 6, shown as comprising a hollow sheet metal tube, can be supported in spaced relation to the cavity surfaces 3 and 4 in any convenient manner. In the illustrated construction in which the tube 6 is a rim-frame insert member of a steering wheel, the position of the insert may be maintained by oppositely positioned coacting blocks, one of which is shown at 7, and is adapted to support and embrace spoke members 8 of the steering wheel frame adjacent connecting pieces 9 between the spokes and insert tube 6. The parting line of the mold is in the plane of the gate, portions of the matching surfaces of the two mold sections being indicated at 10.

Material injected through the gate toward the insert 6 may, for example, be caused to divide and flow at substantially equal rates on opposite sides of the effective cavity by gradually flaring the discharge end portions 11 of the gate at opposite sides of the parting line in a plane normal to the parting plane. The manner in which the plastic material indicated at 15 in Figs. 3 and 4 comes together in two streams from opposite sides of the insert is illustrated particularly by Fig. 3, wherein the leading ends are indicated at 16. Fig. 4 shows the plastic material welded, as at 17, in the region of the parting line.

Referring again to Fig. 2, treatment of the insert there illustrated comprises simply recessing or indenting it to form a channel 20 running entirely along or about the insert in the expected region of confluence of separate streams of plastic. The channel 20 enables a stronger weld simply because of the added thickness of wall of plastic material adjacent the insert in that region. Gas forced ahead of the converging streams of plastic material can escape by way of the parting line surfaces between the mold sections, as already mentioned.

In Fig. 3, the treatment of the insert is shown as modified to the extent of providing an overflow pocket 21 on the insert at the welding region adjacent restricted entrances 22 of the pocket 21. The entrances may be sufficiently restricted so as to permit no flow or only slight flow of plastic into the reception spaces 21 at the end of the injecting operation at which time the injection pressure may be greatly increased. Fig. 3 further illustrates a principle of control for the flow of injected material into the mold cavity, the use of which principle involves no special gating or treatment of the mold cavity surfaces, or special positioning of the insert. This comprises, as shown, roughening the core surface as by sand blasting on opposite sides of the region in which welding of confluent streams is desired to occur, as at 27 and 28. If the core is roughened by an abrading wheel, the direction of cutting is generally parallel to the general extent of the desired welding region. The remainder of the exterior surface of the core are left smooth. If the core is a sand casting, then portions of it can be left rough and others, as along the general cavity in the region of gating, made smooth. Application of the essential idea to other forms of cores or inserts shown herein will be apparent without requiring illustration. A distinct advantage arises from the fact that the moldable material does not have to be removed from the insert, whereas, if concave surfaces of the main mold cavities were roughened to effect the purpose, ejection of finished pieces would be more difficult and also the mold cavity surfaces would be hard to keep clean. The idea can, however, be applied effectively to core members of molds as will later be demonstrated.

In Fig. 4, the insert is shown in a form that can be made from sheet metal as a rolling operation during which flanges 25 at the marginal edges are brought into face-to-face contact and secured together as by stitch welding. This construction not only provides an enlarged reception channel as at 17 for enabling more effective welding, but also permits the escape of gas into the interior of the insert between the flanges 25. The welding of the flanges can be such as to ensure that substantially no plastic material will be forced therebetween at maximum injection pressure.

Fig. 5 illustrates an adaptation of the invention for molded articles of such area or extent that it is necessary or desirable to have converging streams of the plastic material meet at a region remote from the parting line of the mold. This may apply to large panel moldings and continuous frame members such, for instance, as garnish moldings for automobile window trim. At the meeting point of such two streams remote from the parting line, entrapment of air or gas could, as stated above, produce incomplete welding and burning or pocketing of the surface of the molded article. If the mold section which forms the eventually exposed decorative surface of the molding is vented at such region, then disfigurations of the surface can occur in the form of fins requiring a subsequent abrading and polishing operation to remove them. Fig. 5 illustrates, further, the application of molded plastic to but one side of an insert and appropriate treatment of such an insert for exfiltration of gas and air at the welding point of confluent streams of plastic material. The insert 30, made as shown, by two or more joined metal stampings, is placed in the mold on a raised or core portion 31 of the mold section 32. The two stampings can be joined appropriately at overlapping flanges 33 of the stampings. The flanges are received into a slot 34 of the portion 31, the side walls of the slot buttressing the flanges against being separated to any substantial extent incident to pressure on the plastic material in the cavity 35. One complete side of the cavity is formed by the insert 30, as shown. If, for instance, the cavity is gated at opposite ends as at 36 and 37, and the cavity is appropriately shaped and proportioned as to depth, or the core surfaces treated as hereinbefore discussed, the plastic material will tend to flow in two streams, meeting in the region of the flanges 33 and welding in the enlarged space 38. Entrapped air and gas can escape from the cavity between the flanges 33 into the slot 34 of the insert-supporting core which may be enlarged beyond the flanges.

Where problems similar to those presented by such an arrangement as shown by Fig. 5 occur in connection with the molding of an article without an insert, the core portion of a mold section, such as 31a of Fig. 6, may be treated at the expected region of confluence of separate streams of plastic to secure good welding remote from the parting line of the mold sections. A depression 40 can be made in the core 31a, and the core made by complementary sections secured together at abutting faces, such as indicated at 41 and which intercept the depression 40 for approximately its entire extent. Now, if the mold cavity is gated at opposite sides or ends, and the cavity spaces are so proportioned, or the surfaces are so formed that meeting of streams of material from respective gates occurs as at 40, better welding obtains, partly because of the increased space or depth of the cavity at 40, and partly because of the opportunity afforded by the complementary faces 41 for the escape of gas and air. Roughening of the core surface as at 42 and 43 may be used effectively to control the flow of the material, i. e. hold it back from the desired region of welding until the remainder of the cavity is filled. This does not ordinarily affect the value of the molding, because, in most instances, the hollow side is not exposed in use. Since the surface of a core part of a mold section is usually convex, it can be easily kept clean notwithstanding the zonal roughening of it.

Referring to Fig. 7, the insert 45, there shown, is solid in cross section and is illustrated as offset or eccentric to the cavity wall surfaces provided by the mold sections 46 and 47 for the purpose of predetermining the location of the weld line of different streams in the cavity. The offsetting of the core is in a direction opposite from the discharge end of the gate 49 so that wall surfaces of the mold members and insert gradually converge toward the region of the cavity directly opposite the insert from the discharge end of the gate. Assuming the convergence is equal on the top and bottom of the insert and that the entire cavity has a uniform finish, then the narrow parts of the cavity will be filled last by relatively approaching streams of plastic. The wider part of the effective cavity is indicated at 50 and the gradually narrowing portions at 51 on each side of the insert. In the location at which the streams meet and weld, the core is cut away to provide a pocket or channel 52. This may be effected by providing a groove 54 for the full length of the insert, or all around the insert in case the same is an annulus. In order to avoid wasting any more of the plastic material than necessary, and to assure a complete welding adjacent the pocket 52, irrespective of whether or not the welding occurs at the parting line of the mold, a large portion of the slot or groove 54 can be filled with fibrous or porous material, e. g., by winding cord therein, as at 55. The cord is wound under sufficient tension to preclude impregnation of the mass with the plastic material to a substantial extent, while nevertheless affording a reception space in the interstices between adjacent cords, or strands of which composed, for the escape of gas from the cavity. Other materials can be substituted for the gas pervious body 55, and of course the gas pervious body may completely fill the groove or slot 54. The arrangement just described acts similarly to the arrangement shown in Fig. 3, wherein the reception spaces provided as at 21 have restricted entrances thereto from the main cavity.

I claim:

1. In the injection molding of plastic materials of the kind described in a mold cavity adjacent the continuous parting line between the mold members, and wherein the material is injected into the mold cavity at such parting line in such manner that separate streams of the material tend to meet at a predetermined region of the cavity; the method of securing improved welding of the meeting ends of such streams comprising locally indenting a wall surface defining said region in a direction opposite from that wall surface which forms the normally exposed surface of the corresponding region of the article to be molded; and providing a channel adjacent the indentation, which channel is capable of affording passage of gas while constraining the plastic from passage through the channel under maximum injection pressures applied during the injection molding process.

2. In the injection molding of plastic material of the kind described in a cavity formed between coacting mold members separable along a parting line, one of which carries a generally concave surface forming a cavity wall and the other of which carries a generally convex surface forming a cavity wall, and wherein the material is injected into the cavity at the parting line in such manner that separate streams of material tend to meet at a predetermined region of the cavity; the method of securing improved welding between such meeting streams comprising the formation of a gas reception channel in the generally convex surface and at the normal region of the meeting of such streams, and roughening the cavity surface provided by the generally convex surface at opposite sides of the gas reception channel toward the directions from which the meeting edges of the material approach each other in the cavity.

3. In the injection molding of plastic material of the kind described into a cavity formed between coacting mold members and in such manner that separate streams of the material tend to meet in a predetermined region of the cavity, the method of securing improved welding, comprising forming a gas reception channel at said expected region of meeting of the streams and roughening the surface of the wall defining the region of the cavity adjacent the gas reception channel on each side thereof, said channel and roughening being effected only at the side of the molded material which is adapted to be concealed when the molded article is in use.

4. In the injection molding of plastic material of the class described between coacting separable mold sections and about an insert disposed in the cavity between the sections, and in such manner that separate streams of the material tend to meet at a predetermined region of the cavity; the method of securing improved welding of the meeting edges of the streams comprising recessing the insert to provide a deeper cavity at the location of said region than at regions directly adjacent the recess.

5. In the injection molding of plastic materials of the class described between coacting separable mold sections about an insert disposed in the cavity between the sections, and in such manner that separate streams of the material tend to meet at a predetermined region of the cavity; the method of securing improved welding of the meeting edges of the streams comprising the formation of a cavity in the interior of the insert and a restricted entrance from the outer surface of the insert and leading into the cavity of the insert, which restricted entrance is substantially impervious to the passage of the plastic material therethrough into the core cavity at injection molding pressures.

6. In the injection molding of plastic materials of the class described between coacting separable mold sections and about an insert disposed in the cavity between the sections, and in such manner that separate streams of the material tend to meet at a predetermined region of the cavity; the method of securing improved welding of the meeting edges of the streams comprising forming the insert with a hollow interior and with flanges which are maintained in face to face abutment in a manner to provide a gas reception channel between the flanges, which channel leads from the general cavity between the core and mold sections into the hollow interior of the insert.

7. In the injection molding of plastic material of the class described between coacting separable mold sections and about an insert disposed in the cavity between the sections, and in such manner that separate streams of the material tend to meet at a predetermined region of the cavity; the method of securing improved welding of the meeting edges of the streams comprising recessing the insert to provide a deeper cavity at the location of said region than at regions directly adjacent the recess on each side thereof, and at least partially filling the recess with material which is pervious to the passage of gas thereinto and substantially impervious to the passage of the plastic material thereinto under injection molding pressures.

8. A hollow chambered insert for a molded article made by injection molding in such manner as to cause confluence of separate streams of plastic material, said insert having a wall portion relatively indented to provide an exterior channel in the region of confluence of said streams and having its interior chamber provided with a reception passage for gas leading thereinto from the exterior channel of the insert, which passage is substantially impervious to the flow of plastic material therethrough under the heavy pressures of injection molding.

9. A hollow insert for a molded article of the class described, said insert being formed of sheet metal and having wall portions inturned into parallel superposed relation to provide a locally indented portion, and the contiguous surfaces of which wall portions are in sufficiently close abutment to prevent passage of plastic material but permitting gas to pass between them during injection molding of plastic material on an exterior surface of the insert when in a suitable mold cavity.

10. An insert for a molded article made by injection molding in such manner as to cause confluence of separate streams of plastic material, said insert having a channel formed in one side thereof in the region of confluence of said streams, said channel being at least partially filled with material which is pervious to the passage of gas and impervious to the passage of plastic material under the heavy pressures of injection molding.

11. An insert for a molded article made by injection molding in such manner as to cause confluence of separate streams of plastic material, said insert having a gas passage leading inwardly from its exposed surface in the region of confluence of said streams and being locally roughened on each side of the gas passage, whereby to restrain the flow of plastic material toward confluence at the gas passage from opposite regions of a cavity in which the article is formed.

12. An insert for a hollow chambered molded article of the class described having a locally indented portion whereby to provide greater thickness of a molded envelope at the indentation, and a gas passage leading away from said indented portion and from the surface of the insert which is to be covered by plastic material toward the chamber within the hollow article.

JOHN H. LEONARD.